United States Patent Office 3,714,224
Patented Jan. 30, 1973

3,714,224
ACETYLENIC CARBAMATES
Derek William Hills, Welwyn Garden City, and George Sidney Sach, Welwyn, England, assignors to Smith Kline and French Laboratories Limited, Welwyn Garden City, Hertford County, England
No Drawing. Filed Dec. 22, 1969, Ser. No. 887,349
Claims priority, application Great Britain, Dec. 10, 1968, 58,725/68
Int. Cl. C07c *125/06*
U.S. Cl. 260—468 C — 11 Claims

ABSTRACT OF THE DISCLOSURE

The compounds are 4-(N-cyclopropylcarbamoyloxy)-2-butynyl-tri-lower alkylammonium salts having ganglion stimulant activity and intermediates in the preparation thereof.

---

This invention relates to novel quaternary ammonium acetylenic carbamates having pharmacological activity and to intermediates for preparing them.

The quaternary ammonium acetylenic carbamates of this invention are represented by the following formula:

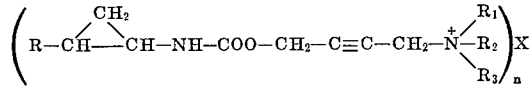

in which:

R represents hydrogen or phenyl, said phenyl being optionally substituted by lower alkyl, for example methyl or ethyl, or halo, for example chloro or fluoro, substituents;

$R_1$, $R_2$ and $R_3$ which may be the same or different, each represent a lower alkyl group, for example methyl or ethyl;

$n$ is 1, 2 or 3 and

X is a pharmaceutically acceptable anion being monovalent when $n$ is 1, divalent when $n$ is 2 and trivalent when $n$ is 3.

The anions represented by X in Formula I are anions from inorganic acids and are monovalent for example halide such as chloride or bromide, divalent for example sulfate or trivalent for example phosphate.

The compounds of Formula I in which R is phenyl or substituted phenyl may exist in either the cis or trans form and all such isomers are included within the scope of the invention, although the trans isomers are pharmacologically preferred as usually being more active.

The compounds of Formula I may be prepared by suitable treatment of a compound of the following formula:

FORMULA II

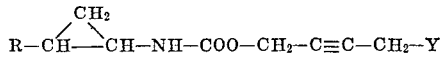

in which R is as defined above and Y represents halo or a tertiary amino group, i.e.

where $R_1$ and $R_2$ are each lower alkyl groups. A compound of Formula II in which Y is halo may be converted into a compound of Formula I by reaction with an appropriate tertiary amine, preferably in an inert organic solvent such as, for example, ether, benzene, or acetone, or with an appropriate secondary amine and converting the tertiary amine so formed to the quaternary ammonium compound by treatment with a reactive lower alkyl ester of an inorganic acid. A compound of Formula II in which Y is $NR_1R_2$ may be converted into a quaternary ammonium compound by treatment with a reactive lower alkyl ester of an inorganic acid.

The compounds of Formula II are novel compounds and form part of the present invention.

Alternatively, the compounds of Formula I may be prepared by reacting an alcohol of the following formula:

FORMULA III

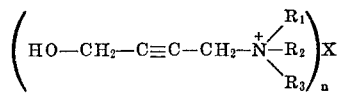

in which $R_1$, $R_2$, $R_3$, $n$ and X have the same meaning as in Formula I, with an isocyanate of the formula:

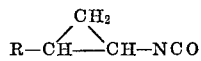

or an acid azide of the formula:

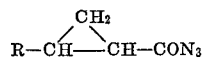

in which R has the same meaning as in Formula I, to form the quaternary ammonium compounds. The reaction is preferably carried out in an inert organic solvent such as, for example, acetonitrile.

The compounds of Formula II in which Y is halo may be prepared by reacting an amine of the formula:

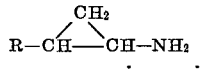

in which R has the same meaning as in Formula I, with a 4-halo-2-butynyl haloformate of the formula:

$$Y'\text{—COO—CH}_2\text{—C}\equiv\text{C—CH}_2\text{—Y}'$$

in which Y' is halo, to form a compound of Formula II. The reaction may be carried out using an excess of the amine or in the presence of an acid acceptor, for example a base such as pyridine or a compound such as sodium hydrogen carbonate. The reaction is preferably carried out in an inert organic solvent, for example benzene, ether or methylene chloride, or in water when sodium hydrogen carbonate is used.

The compounds of Formula II in which Y is a tertiary amino group may be prepared by reacting the corresponding compound in which Y is halo with an appropriate secondary amine.

Alternatively, the compounds of Formula II may be prepared by reacting an alcohol of the following formula:

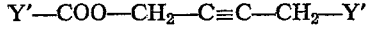

in which Y is halo or $NR_1R_2$ and $R_1$ and $R_2$ are each lower alkyl, with an appropriate isocyanate or acid azide, preferably in the presence of an inert solvent, for example ether, benzene or petroleum.

The quaternary ammonium acetylenic carbamates of this invention have pharmacological activity in the animal body. In particular, the compounds of Formula I have muscarinic ganglion stimulant activity (by which we mean activity which can be blocked by atropine) in the autonomic nervous system and are therefore of use as hypertensive agents. For instance, the pharmaceutically acceptable salts, for example the chloride, of the trans-4 - [N - 2 - phenylcyclopropyl)carbamoyloxy]-2-butynyl-trimethylammonium cation have been found to have markedly pronounced and selective ganglion stimulant activity.

The activity of the compounds of this invention may be demonstrated by administration to anesthetized cats to produce pressor activity and increase in salivary flow at doses of about from 0.001–0.010 mg./kg. administered by intravenous injection.

The compounds of the invention may also have herbicidal activity.

For therapeutic use, the pharmacologically active compounds of the invention will normally be administered as a pharmaceutical composition comprising as the essential active ingredient at least one such compound in association with a pharmaceutical carrier therefor. Advantageously, the composition will be made up in a dosage unit form appropriate to the desired mode of administration, which will normally be by the parenteral route. For parenteral administration the dosage unit may take the form of, for example, a sterile solution, such as a saline solution, of the active ingredient packaged in a suitable container such as an ampoule. Such a solution may be administered intravenously, if necessary after being diluted with further inert liquid.

The following examples are not limiting but illustrate the invention.

EXAMPLE 1

Cyclopropylamine (5.1 g.) in methylene chloride (100 ml.) is cooled with stirring to 13° C. and a solution of 4-chloro-2-butynyl chloroformate (7.57 g.) in methylene chloride (10 ml.) is added over 20 minutes at 12–14° C. The reaction mixture is stirred for a further one hour and the upper oily layer which forms is then separated and the lower methylene chloride layer is washed with water (2× 100 ml. portions). The methylene chloride layer is dried over magnesium sulfate and concentrated under reduced pressure to give an oil, which is treated with charcoal after being dissolved in a mixture of benzene and cyclohexane, and then crystallized from a mixture of ether and petroleum (B.P. 40–60° C.) to yield 4-(N-cyclopropylcarbamoyloxy)-2-butynyl chloride, M.P. 49–50.5° C.

This 4-(N-cyclopropylcarbamolyoxy)-2-butynyl chloride (3.22 g.) in dry acetone (100 ml.) is treated with trimethylamine (25 ml.). The solution is stirred at room temperature for three hours. The resulting crystals are filtered off, washed with acetone and crystallized from a mixture of ethanol and acetone. The product so obtained is dried in the air to give 4-(N-cyclopropylcarbamoyloxy)-2-butynyltrimethylammonium chloride as the monohydrate, M.P. 127–130° C.

EXAMPLE 2

4-chloro-2-butynyl chloroformate (8.4 g.) is added at 10–15° C. over 20 minutes to dl-trans-2-phenylcyclopropylamine (13.21 g.) dissolved in methylene chloride (150 ml.). The mixture is stirred for a further three hours at room temperature after the addition is complete and then water (100 ml.) is added. The resulting organic layer is separated, washed with water (3× 100 ml. portions) and dried over magnesium sulfate. The solvent is removed under reduced pressure and the residue is crystallized from a mixture of ethanol and n-hexane to give dl-trans-4-(N-2-phenylcyclopropylcarbamoyloxy) - 2 - butynyl chloride, M.P. 90–90.5° C.

Ten grams of the above prepared chloride intermediate in dry acetone (100 ml.) is stirred with trimethylamine (15 ml.) for 16 hours at room temperature. The resulting solid is filtered off, washed with dry acetone and crystallized from a mixture of ethanol and ether to give dl-trans - 4 - [N-(2-phenylcyclopropyl)carbamoyloxy]-2-butynyltrimethylammonium chloride, M.P. 110–120° C. The compound may be obtained in various crystalline modifications having different melting points.

The product is converted from the chloride into the sulfate salt by dissolving the chloride in methanol and passing the resulting solution down a column of an anion exchange resin (sulfate form), following which the eluant is concentrated under reduced pressure to form an oil. Trituration of this oil with ether gives a solid which can be crystallized from a mixture of ethanol and ether to give bis{dl-trans-4-[N-(2-phenylcyclopropyl)-carbamoyloxy]-2-butynyltrimethylammonium} sulfate.

EXAMPLE 3

4-(N-cyclopropylcarbamoyloxy) - 2 - butynyl chloride, prepared as in Example 1, (3.32 g.) in benzene (100 ml.) is treated with dimethylamine (25 ml.) and the resulting mixture is stirred for 16 hours at room temperature. The mixture is then extracted with water (2× 100 ml. portions) and the benzene solution concentrated under reduced pressure after drying over magnesium sulfate. The resulting oil (2.255 g.) is dissolved in toluene (25 ml.) and ethyl iodide (2.8 ml.) added. The mixture is left at room temperature for 24 hours and the toluene is decanted from the oil, which is dissolved in acetone. The solution is allowed to stand and the crystals which form are filtered off and recrystallized from a mixture of ethanol and ether to give 4-(N-cyclopropylcarbamoyloxy)-2-butynyldimethylethylammonium iodide, M.P. 102.5–103.5° C.

EXAMPLE 4 dl-trans - 2 - (p-chlorophenyl)cyclopropylisocyanate (7 g.) and 4-chloro-2-butyn-1-ol (4.02 g.) in benzene (50 ml.) are heated together under reflux for three hours. Three drops of pyridine are added and the heating is continued for a further 15 minutes, after which the mixture is allowed to stand at room temperature for 60 hours. The solvent is removed and the residue obtained is crystallized from a mixture of ether and petroleum (B.P. 40–60° C.) to give dl-trans-4-[N-(2-p-chlorophenylcyclopropyl)carbamoyloxy]-2-butynyl chloride, M.P. 86–87.5° C.

This chloride intermediate (2.2 g.) in benzene (50 ml.) is treated with trimethylamine (5 ml.) and the mixture is stirred at room temperature for 24 hours. The resulting solid is filtered off the give dl-trans-4-[N-(2-p-chlorophenylcyclopropyl)carbamoyloxy] - 2 - butynyltrimethylammonium chloride which is converted to the corresponding sulfate by dissolving in methanol and passing the resulting solution down an ion exchange column (sulfate form). The eluate is concentrated under reduced pressure and the residue crystallized fro ma mixture of ethanol and ether to give bis{dl-trans-4-[N-(2-p-chlorophenylcyclopropyl)carbamoyloxy] - 2 - butynyltrimethylammonium}sulfate, M.P. 173.5–174.5° C.

EXAMPLE 5 d-trans-2-phenylcyclopropylamine L(−) tartrate, described by Kaiser et al. in J. Med. Pharm. Chem., 1962, 5, 1243 $[\alpha]_D^{27} = +31.3°$ [1% in water], (12.75 g.) is suspended in water (60 ml.) and 10% aqueous sodium bicarbonate (168 ml.) is added together with ice. Acetone (50 ml. is added, followed by 4-chloro-2-butynyl chloroformate (8.35 g.) and the contents of the flask are shaken vigorously for 10 minutes. The solid is filtered off, washed with water and taken up in methylene chloride. The solution is washed with N-hydrochloric acid (100 ml.), then with 5% aqueous sodium bicarbonate (100 ml.), and water (100 ml.). The methylene chloride solution is dried over magnesium sulfate and then concentrated under reduced pressure. The residue is crystallized twice from a mixture of ether and petroleum (B.P. 40–60° C.) to give d - trans-4-[N-(2-phenylcyclopropyl)carbamoyloxy]-2-butynyl chloride, M.P. 63.5–64° C.

This chloride (5.27 g.) is stirred with trimethylamine (25 ml.) in dry acetone (100 ml.) at room temperature for four hours. The product is filtered off, washed with dry acetone and crystallized twice from a mixture of ethanol, acetone and ether twice and finally from a mixture of ethanol and ether to give d-trans-4-[N-(2-phenylcyclopropyl)carbamoyloxy] - 2 - butynyltrimethylammonium chloride (4.3 g.), M.P. 144–145° C.

$$[\alpha]_D^{25} = +63.8°$$

[1% in water].

EXAMPLE 6 dl - trans - 2 - (m - chlorophenyl)cyclopropylisocyanate, prepared as described by Kaiser et al., loc. cit. (5.0 g.), is reacted with 4-chloro-2-butyn-1-ol (2.7 g.) in dry benzene (80 ml.) in the presence of cobalt 2-ethylhexanoate (catalytic amount) at room temperature for five days. The solvent is evaporated and the residual oil is crystallized (charcoal) from a mixture of ether and petroleum (B.P. 40-60° C.). Recrystallization from a mixture of benzene and petroleum (B.P. 80-100° C.) followed by chromatography through a column of silica gel using a mixture of benzene and ethyl acetate as eluant and a final crystallization from a mixture of ether and petroleum (B.P. 40-60° C.) gives dl - trans - 4 - [N - (2 - m-chlorophenylcyclopropyl)carbamoyloxy] - 2 - butynyl chloride, M.P. 91.5-93° C.

This chloride (1.9 g.) in acetone (50 ml.) is stirred at room temperature with trimethylamine (15 ml.) overnight. The mixture is allowed to stand several days when an oil and a solid are deposited. These are combined and crystallized from a mixture of acetone and ethanol several times to give dl - trans - 4 - [N - (2 - m - chlorophenylcyclopropyl)carbamoyloxy] - 2 - butynyltrimethylammonium chloride, a deliquescent solid, M.P. 95.5-98° C.

EXAMPLE 7

By the procedure of Example 4 using 2-(m-tolyl)-cyclopropylisocyanate as a starting material, 4-[N-(2-m-tolylcyclopropyl)carbamoyloxy] - 2 - butynyltrimethylammonium chloride is obtained.

EXAMPLE 8 dl - trans - 4 - [N - (2 - phenylcyclopropyl)carbamoyloxy]-2-butynyltrimethylammonium chloride, prepared as in Example 2, is dissolved in methanol and the resulting solution is passed through an ion exchange resin (phosphate form) to give, after removing the solvent, tris{dl-trans - 4 - [N - (2 - phenylcyclopropyl)carbamoyloxy]-2-butynyltrimethylammonium}phosphate.

EXAMPLE 9 dl - trans - 4 - [N - (2 - phenylcyclopropyl)carbamoyloxy]-2-butynyltrimethylammonium chloride is dissolved in distilled water so that the resultant solution contains 10 mg./ml. of the chloride. This solution is then filtered through a bacteria proof filter and transferred aseptically into 2 ml. ampoules which are then sealed. For intravenous injection the contents of each ampoule may be mixed with 500 ml. of normal saline solution, the resulting solution being injected at the appropriate rate.

What is claimed is:

1. A compound of the formula:

$$\left( R-CH\underset{CH_2}{\overset{CH_2}{\diagup\diagdown}}CH-NH-COO-CH_2-C\equiv C-CH_2-\overset{+}{N}\underset{R_3}{\overset{R_1}{\diagdown}}R_2 \right)_n X$$

in which:

R is hydrogen or phenyl, said phenyl being optionally substituted by lower alkyl or halo;
$R_1$, $R_2$ and $R_3$ are lower alkyl;
$n$ is 1, 2 or 3 and
X is a pharmaceutically acceptable anion being monovalent when $n$ is 1, divalent when $n$ is 2 and trivalent when $n$ is 3.

2. A compound according to claim 1 in which R is phenyl, optionally substituted by lower alkyl or halo and in which the compound is in the trans form.

3. A compound according to claim 1 in which R is hydrogen, $R_1$, $R_2$ and $R_3$ are methyl, $n$ is 1 and X is chloro.

4. A compound according to claim 1 in which R is phenyl, $R_1$, $R_2$ and $R_3$ are methyl, $n$ is 1 and X is chloro.

5. A compound according to claim 1 in which R is phenyl, $R_1$, $R_2$ and $R_3$ are methyl, $n$ is 2 and X is sulfate.

6. A compound according to claim 1 in which R is hydrogen, $R_1$ and $R_2$ are methyl, $R_3$ is ethyl, $n$ is 1 and X is iodo.

7. A compound according to claim 1 in which R is p-chlorophenyl, $R_1$, $R_2$ and $R_3$ are methyl, $n$ is 2 and X is sulfate.

8. A compound of the formula:

$$R-CH\underset{CH_2}{\overset{CH_2}{\diagup\diagdown}}CH-NH-COO-CH_2-C\equiv C-CH_2-Y$$

in which:

R is hydrogen or phenyl, said phenyl being optionally substituted by lower alkyl or halo and
Y is halo or $$N\underset{R_2}{\overset{R_1}{\diagdown}}$$

where $R_1$ and $R_2$ are lower alkkyl except that Y is not halo when R is hydrogen.

9. A compound according to claim 8 in which R is phenyl and Y is chloro.

10. A compound according to claim 8 in which Y is $$N\underset{R_2}{\overset{R_1}{\diagdown}}$$

where $R_1$ and $R_2$ are lower alkyl.

11. A compound according to claim 8 in which R is phenyl, said phenyl being optionally substituted by lower alkyl or halo.

References Cited

UNITED STATES PATENTS 2,973,385  2/1961  Rorig _____ 260—472
3,226,426  12/1965  Hopkins et al. _____ 260—468

FOREIGN PATENTS 15,115  7/1964  Japan _____ 260—468

LORRAINE A. WEINBERGER, Primary Examiner

L. A. THAXTON, Assistant Examiner

U.S. Cl. X.R.

260—471 C, 472; 424—300

PO-1050
(5/69)

UNITED STATES PATENT OFFICE
CERTIFICATE OF CORRECTION

Patent No. 3,714,224         Dated January 30, 1973

Inventor(s) Derek William Hills and George Sidney Sach

It is certified that error appears in the above-identified patent and that said Letters Patent are hereby corrected as shown below:

Column 1, between line 25 and the formula in lines 26-29, insert -- FORMULA I --.

Column 3, line 35, "cyclopropylcarbamolyoxy" should read -- cyclopropylcarbamoyloxy --.

Column 3, line 48, "13.21" should read -- 13.31 --.

Signed and sealed this 10th day of July 1973.

(SEAL)
Attest:

EDWARD M. FLETCHER, JR.                Rene Tegtmeyer
Attesting Officer                      Acting Commissioner of Patents